United States Patent [19]

Wristers et al.

[11] 4,036,737

[45] July 19, 1977

[54] HYDROCRACKING IN STRONG ACID SYSTEMS WITH NOBLE METAL COMPONENT

[75] Inventors: Jos Wristers, Plainfield; Michael Siskin, Maplewood; Joseph J. Porcelli, Scotch Plains, all of N.J.

[73] Assignee: Exxon Research and Engineering Company, Linden, N.J.

[21] Appl. No.: 577,350

[22] Filed: May 14, 1975

Related U.S. Application Data

[63] Continuation-in-part of Ser. No. 317,610, Dec. 22, 1972, Pat. No. 3,901,790.

[51] Int. Cl.$^2$ .............................................. C10G 13/08
[52] U.S. Cl. ..................................... 208/108; 208/111; 208/112; 252/441; 252/477 R; 260/667
[58] Field of Search ................. 208/111, 108; 260/667

[56] References Cited

U.S. PATENT DOCUMENTS

| | | | |
|---|---|---|---|
| 2,446,998 | 8/1948 | Burk | 208/108 |
| 3,409,684 | 11/1968 | Aristoff et al. | 260/667 |
| 3,847,795 | 11/1974 | Rieve et al. | 208/108 |

*Primary Examiner*—Delbert E. Gantz
*Assistant Examiner*—G. E. Schmitkons
*Attorney, Agent, or Firm*—Jay Simon; John W. Ditsler

[57] ABSTRACT

Hydrocarbon feedstocks are hydrocracked by contacting the feedstock in the presence of hydrogen and under hydrocracking reaction conditions with a catalyst comprised of a metal fluoride, the metal being boron, tantalum, niobium or mixtures thereof, a fluoride containing Bronsted acid and a Group VIII noble metal hydrogenation component, the Bronsted acid being present in at least an equi-molar amount relative to the metal fluoride and sufficient to dissolve at least a portion of the metal fluoride. The presence of the noble metal hydrogenation component serves to extend the hydrocracking catalyst life of the metal fluoride and fluoride containing Bronsted acid. The catalyst can be described as a slurry or dispersion composed of a solid noble metal on a support in a liquid phase acid system.

13 Claims, No Drawings

HYDROCRACKING IN STRONG ACID SYSTEMS WITH NOBLE METAL COMPONENT

CROSS REFERENCE TO RELATED APPLICATION

This application is a continuation-in-part of copending U.S. Patent Application Ser. No. 317,610, filed Dec. 22, 1972, which issued Aug. 26, 1975 as U.S. Pat. No. 3,901,790.

FIELD OF THE INVENTION

This invention relates to an improved hydrocracking catalyst and an improved hydrocracking process. More particularly, this invention relates to a hydrocracking process and catalyst, therefore wherein a noble metal hydrogenation component is utilized in conjunction with a metal fluoride/fluoride containing Bronsted acid catalyst to enhance the hydrocracking catalyst life of the metal fluoride/fluoride containing Bronsted acid catalyst.

DESCRIPTION OF THE PRIOR ART

Conventional hydrocracking operations generally employ a catalyst comprising one or more components exhibiting hydrogenation activity either in the elemental form or as the oxide or sulfide. Such components are usually disposed by impregnation of the component on inorganic porous supports, e.g. silica, silica-alumina, crystalline alumino silicates, etc. While such operations are eminently successful, they suffer certain disadvantages, for example, high hydrogen pressures, e.g. 1200–2000 psig, are required to avoid heavy coke deposition on the catalyst (leading to severely reduced catalytic activity) and the intolerance of such catalysts to sulfur-containing feedstocks.

In aforementioned U.S. Pat. No. 3,901,790, the disclosure of which is thereby incorporated by reference, it was proposed to hydrocrack hydrocarbon feedstocks with a catalyst comprising a metal halide and a protonic acid capable of donating a proton to the system. According to this invention, the hydrocracking catalyst life of some of the catalyst systems disclosed in U.S. Pat. No. 3,901,790 can be significantly enhanced by adding to the catalyst a Group VIII noble metal hydrogenation component.

Catalyst systems containing Friedel-Crafts metal halide/hydrogen halide components in conjunction with supported metal hydrogenation catalysts have been described in U.S. Pat. No. 3,409,684 as being useful in the partial hydrogenation of condensed polynuclear aromatics. Additionally, catalyst systems wherein a noble metal on a support, e.g., alumina, has been chemically reacted with a Friedel-Crafts halide such as $AlCl_3$ have also been reported in various patents, e.g., U.S. Pat. Nos. 3,022,252; 2,914,461; 2,964,462 and 3,031,419. Nevertheless, it is believed that the particular catalyst system and its use as a hydrocracking catalyst described herein below has heretofore not been disclosed.

SUMMARY OF THE INVENTION

In accordance with this invention, it has been found that a wide variety of hydrocarbon feedstocks, including sulfur-containing feedstocks, can be successfully hydrocracked at relatively low temperatures and pressures with a long life catalyst system comprising a metal fluoride, a fluoride-containing Bronsted acid capable of donating a proton to the system, and a Group VIII noble metal supported hydrogenation component.

Essentially, the hydrocarbon feed is relatively insoluble in the acid catalyst. Thus, when hydrocarbon feeds are brought into contact with the catalyst, the more basic compounds are preferentially extracted into the catalyst phase and hydrocracked. The products of the hydrocracking reaction, e.g., paraffins and naphthenes, are then released back into the hydrocarbon phase.

The make-up of the catalyst system is critically important to the functioning of the catalyst in a hydrocracking mode. Thus, as described in Ser. No. 317,610 (now U.S. Pat. No. 3,901,790) the Bronsted acid should be present in sufficient amount to dissolve at least a portion of metal fluoride catalyst component and, based on metal fluoride, the Bronsted acid should be present in a mole ratio of at least 1:1 in the reaction zone. Generally, however, the activity of the catalyst system increases as the molar ratio of Bronsted acid to metal fluoride increases (but will ultimately level out as the Bronsted acid dilutes the overall acidity of the reaction system). Thus, the molar ratio of Bronsted acid to metal fluoride is preferably at least about 2:1, more preferably at least about 5:1. The upper limit is not critical since the Bronsted acid may serve as a diluent or solvent for the reaction. Depending on the relative amounts of materials employed this portion of the catalyst will exist as a separate phase in the reaction mixture and at least some portion or all of the metal halide will be dissolved in the Bronsted acid.

Metal fluorides useful in catalyst formation are the fluorides of tantalum, niobium and boron. Often, in the use of tantalum and niobium, these metals are formed in intimate mixtures and, therefore, mixtures of tantalum and niobium fluorides may also be employed. Tantalum and niobium are preferred.

The Bronsted acid component of the catalyst should be a fluoride containing compound capable of donating a proton to the system, a protonic acid. (Fluoride containing materials are preferred in order to avoid undesirable halogen exchange reactions.) Useful acids include hydrogen fluoride, fluorosulfonic acid, trifluoromethane sulfonic acid, and trifluoroacetic acid. The acids may be employed alone or mixed with their corresponding anhydrides. Hydrogen fluoride is normally preferred.

The third component of the catalyst system can be broadly described as a Group VIII noble metal hydrogenation component. Such components are normally utilized by themselves or in conjunction with other materials to hydrogenate unsaturated hydrocarbons. The hydrogenation component should be a supported metal or oxide or sulfide thereof, and the metal can be of the platinum group (platinum, osmium, palladium, iridium) or the palladium group (palladium, ruthenium, rhodium). Of these, platinum palladium and iridium are preferred; and palladium and platinum being particularly preferred.

The hydrogenation component is preferably carried on a solid support which does not react with the acidic components of the catalyst system and is capable of mixing with the acidic components, that is, the hydrogenation component will exist, likely as a slurry or dispersion, in the acid catalyst phase rather than in the hydrocarbon phase. Supports that can be used are charcoal, char, carbon, coke, fluorided or sulfonated refractory oxides, Teflon and the like. In this case, such known untreated supports as alumina, silica, titania and other of these refractory oxides are not suitable due to the susceptibility of these materials to attack and degradation by fluorides.

The hydrogenation component of the catalyst system is generally commercially available but can be easily prepared by contacting the carbon support with an aqueous solution of the metal halide evaporating off the water and then reducing with hydrogen for 2 hours at about 300° C. The hydrogenation component may range preferably in particle diameter size from 38 micrometers to 25 millimeters, preferably 75 micrometers to 12.5 millimeters.

The amount of hydrogenation component utilized is not critical but should be sufficient to effect an increase of the catalyst life of the acidic hydrocracking catalyst. Catalyst life begins to be increased at hydrogenation component levels at least about 0.0001 wt. % metal hydrogenation component wt. %, based on acid, preferably 0.001 and more preferably at least about 0.05 wt. %. Increasing amounts of hydrogenation component serve to simply increase the hydrogenation rate.

The completed catalyst comprises a liquid phase acid containing a supported noble metal. As mentioned, the support should be one that does not react with the acid. The concentration of the noble metal on the support can range from about 0.01 to about 20 wt. % based on the support, preferably about 0.2 to about 10 wt. %. The supported metal constituent can range in particle size from a fine powder, i.e., with diameters from 38 micrometers to 25 millimeters, although particle size is not a critical item of the make-up of the catalyst (it being sufficient only in that the supported metal form a dispersion in the acid phase catalyst). The supported metal increases acid catalyst life when present in only minute amounts, i.e., about $1.0 \times 10^{-4}$ wt. %, preferaby $1.0 \times 10^{-3}$ wt. %, and more preferably $5.0 \times 10^{-2}$ wt. % (noble metal wt. % based on acid). When the powdered noble metal is added to the acid, it immediately becomes wetted and forms a dispersion in the acid. Consequently, the supported metal is not separated from the acid after repeated extractions with hydrocarbons. However, the supported noble metal can be separated from the acid by filtration, centrifugation or other conventional methods.

While not wishing to be bound by any particular theory, it is believed that the fluoride containing acid protonates, the aromatic forming a carbonium ion. The noble metal then catalyses the hydrogenation of the carbonium ion to a partially or completely saturated compound which is then cracked by the acid.

The catalyst of this invention can be utilized to hydrocrack a wide variety of hydrocarbon feedstocks, derived from naturally occurring petroluem, tar sands, bitumen, coal liquids, or shale oil liquids. Suitable feedstocks include the typical gas oil cuts (atmospheric or vacuum) cycle stocks, residua, and the like. The hydrocracking process may also be utilized to convert less complex feeds to lower molecular weight products or more tractable compounds. Thus, hydrocarbons such as benzene, toluene, xylene, anthracene, phenanthrene, pyrene, chrysene, high molecular weight parafins (ranging to and including waxes and polymers), naphthalenes and the like may be converted in accordance with the invention.

The term "gas oil" as employed in the art includes a variety of petroluem stocks. As utilized herein, this term, unless further modified, includes any fraction distilled from petroleum which has an initial boiling point of at least about 400° F (~215° C), a 50 percent point of at least about 500° F (260° C) and an end point of at least about 600° F (~315° C) and boiling substantially continuously between the initial boiling point and the end point. The exact boiling range of a gas oil accordingly will be determined by the initial boiling point, the 50 percent point, and by the end point. In practice, petroleum distillations have been effected under vacuum at temperatures as high as 1200° F (~695° C), corrected to atmospheric pressure. Accordingly, in the broad sense, a gas oil is a petroluem fraction which boils substantially continuously within an approximate range of 400° F (215° C) to 1200° F (645° C), the 50 percent point being at least about 500° F. (260° C.). Thus, a gas oil may boil over the entire approximate range of 400° F. (215° C.) to 1200° F. (645° C.) or over an intermediate range such as 500° F. (260° F.) to 900° F. (480° C.).

A residual stock is any fraction which is not distilled. Accordingly, any fraction, regardless of its initial boiling point, which includes heavy bottoms, such as tars, asphalts, etc., is a residual fraction. A residual stock may be the portion of the crude remaining undistilled at about 1200° F. (645° C.) or it may be made up of a gas oil fraction plus the portion undistilled at about 1200° F.

The refractory cycle stocks are cuts of cracked stocks which boil above the gasoline boiling range usually between about 400° F. (215° C.) and about 850° F. (450° C.). The refractory cycle stocks can be charged to the process of this invention, together with a fresh petroluem charge stock or the refractory cycle stocks may be charged to the process alone.

The hydrocracking reaction may be carried out in bulk, that is, in the absence of any solvent or in the presence of a solvent or diluent material. Useful solvent or diluent compositions include fluorinated acids and-/or acid anhydrides, HF, etc. Hydrogen fluoride is the preferred reaction diluent. When a solvent or diluent is used, sufficient amounts are employed to maintain the viscosity of the reaction mixture at a desired level. Typically, from about 0.10 to 50, preferably from about 0.1 to 20, and more preferably about 0.3 to 5 volumes of solvent or diluent are used per volume of hydrocarbon feedstock.

Hydrocracking in accordance with the present invention is carried out at a temperature in the range of 0° to 600° C., preferably in the range of 20° to 300° C. Most preferably, the reaction is conducted at a temperature between 60° to 200° C. The hydrocracking reaction is preferably conducted at a pressure sufficient to maintain the hydrocarbon feedstock and catalyst in substantially the liquid phase. In general, the hydrogen partial pressures in the reaction zone will vary from about 25 to 3000, preferably from about 100 to 1000 psig. Typically from 0.01 to 5.0 moles, preferably from 0.05 to 2.0 moles, of hydrogen per mole of hydrocarbon feedstock are present in the reaction zone, depending upon reactor size. The reaction time will depend upon the temperature employed, the nature of the feedstock and the products desired and, thus, may vary widely. In most cases, the reaction time will be within the range of 0.5 minute to 50 hours, preferably within the range of 1 to 250 minutes.

Hydrogen employed in the hydrocracking of the feedstock may be derived from any suitable source. Typically, in a refinery operation, the hydrogen employed may be a crude or an impure hydrogen stream such as that obtained from a naphtha reforming operation. Alternatively, hydrogen may be generated in situ by introducing hydrogen donors into the reaction zone during the course of the reaction. Examples of useful hydrogen donors include materials such as decalin, isobutane, methylcyclohexane and the like. Most preferably, elemental hydrogen is introduced into the reaction zone.

In a typical refinery operation, the process feedstock, hydrogen and optional solvent are mixed with the catalyst in a substantially liquid phase operation. The contacting may be carried out in a plurality of serially connected mixing zones. In this type of operation, the catalyst phase and hydrocarbon phase are separated, for example by settling, following reaction and the product recovered from unreacted feedstock utilizing conventional distillation techniques.

Except when sulfur containing feedstocks are used the amount of metal halide catalyst component present in the reaction zone is not always critical. Typically, from about 0.001 to 10, preferably 0.01 to 5.0 weight parts of metal halide are present in the reaction zone per weight part of feedstock. When sulfur impurities or aromatics (excluding toluene or benzene) are present in the feedstock, it is desirable, if maximum catalyst activity is desired, to have a molar excess of metal fluoride present in the reaction zone relative to the amount of sulfur poison (sulfur-containing compounds) or aromatics present in the reaction zone at any point in time. Sulfur and sulfur-containing compounds are believed to form complexes with the metal fluoride catalyst constituent. As equilibrium is established between the amount of sulfur complex formed and the amount of sulfur in the hydrocarbon phase. Accordingly, not all of the sulphur present reacts with or complexes with the metal halide catalyst constituent. Further, the complex formation reaction appears to be reversible via an equilibrium or reaction in that the concentration of sulfur in the acid phase can be diminished when the catalyst is contacted with a sulfur-free feedstock. In an operation wherein a support catalyst is used, the reaction liquid hourly space velocity (the liquid volume of feed per hour per volume of catalyst) would be maintained at levels of less than about 200, usually between about 0.1 and 20.

As noted previously, the catalyst system of the present invention is not adversely affected by the presence of sulfur compounds. However, if maximum catalyst activity is desired, the feedstocks, diluents, and individual catalyst constituents should be purified prior to use to remove water. The presence of small amounts of water are tolerable if the corresponding catalyst loss or drop in catalyst activity can be accepted. Preferably, the water concentration within the reaction zone should not exceed about 0.01 wt. %, preferably not more than about 10 wppm, based on total feed. Most preferably, the reaction is conducted in the substantial absence of water.

Unless otherwise specified, all the following examples were carried out utilizing the following general procedures:

Into a 1 liter Parr Model 4521 stirred Hasteloy C reactor (or a 300 cm³ Hasteloy C Autoclave Engineers Autoclave) were placed tantalum pentafluroide (Ozark-Mahoning Company) as a white powder mp 97° C., and 5% Platinum supported on carbon (Engelhard). The reactor was closed and partially evacuated. Hydrogen fluoride was then added from a lecture bottle by direct connection. The reactor was then pressurized with hydrogen, the hydrocarbon reactants and solvent were added, and the reaction mixture was stirred at 600 ppm, usually at 50° C. A liquid sample was taken at 50° C. by connection of an evacuated 10 cm³ stainless steel cylinder to the reactor and upon opening the valves connecting the two forcing liquid though a dip stick into the smaller vessel by the difference in pressure. The liquid sample was cooled to −70° C. and a sample analyzed on an Aerograph Model 1520 Gas Chromatograph with a DC 200 on Chromosorb P column (⅛ inch by 30 feet) at 90° C. The reactor was then cooled to room temperature and all of the gases were collected into an evacuated 100 cm³ stainless steel cylinder cooling in liquid nitrogen until the pressure in the reactor was 0 psig. This process took several steps and included periodic venting of hydrogen at liquid nitrogen temperatures. The following examples illustrate the composition of the catalyst and reactants and the product distributions with their respective conversions.

EXAMPLE 1

Reaction of Cyclohexane in n-Hexane at 50° C. with TaF$_5$—HF Catalyst

| Reactants | ml | g | moles | mole % |
|---|---|---|---|---|
| Cyclohexane | 16.2 | 12.6 | 0.15 | 10 |
| n-Hexane | 176.3 | 116.4 | 1.35 | 90 |
| H2 | — | 0.4 | 0.2 | — |
| Catalyst | | | | |
| TaF5 | 14.6 | 69.0 | 0.25 | |
| HF | 20 | 20 | 1 | |
| 5% Pt/C | — | 1 | 2.56×10−4 | |
| Reaction Conditions | | | | |
| Temperature, ° C | 50±2° | | | |
| Time, Hr. | 5 | | | |
| Moles of Reactants / Moles of Catalyst | 6 | | | |

| Product Distribution | Area % |
|---|---|
| C$_1$–C5 | 2.5 |
| 2,2-dimethyl butane (2,2-DMC$_4$) | 37.7 |
| 2,3-dimethyl butane (2,3-DMC$_4$) + 2-methyl pentane (2-MC$_5$) | 31.5 |
| 3-methylpentane (3-MC$_5$) | 10.4 |
| n-hexane (n-C$_6$) | 16.1 |
| methylcyclopentane (MCP) + cyclohexane (CyC$_6$) | 1.9 |
| Total | 100.1 |

| Conversions | Percent | Rate (hr−1) |
|---|---|---|
| CyC$_6$ → i-C6 | 80.8 | 0.29 |
| n-C$_6$ → i-C6 | 82.2 | 0.33 |

EXAMPLE 2

Reaction of Decalin in n-Hexane at 50° C. with the TaF$_5$—HF Catalyst

| Reactants | ml | g | moles | mole % |
|---|---|---|---|---|
| Decalin | 23.5 | 20.7 | 0.15 | 10 |
| n-C6 | 176.3 | 116.4 | 1.35 | 90 |
| H2 | — | 1.2 | 0.6 | — |
| Catalyst | | | | |
| TaF5 | 11.7 | 55.2 | 0.20 | |
| HF | 20 | 20 | 1 | |
| 5% Pt/C | — | 1 | 2.56×10−4 | |
| Reaction Conditions | | | | |
| Temperature, ° C. | 50°±2 | | | |
| Time, hr. | 5 | | | |
| Moles of Reactants / Moles of Catalyst | 7.5 | | | |

| Product Distribution | Area % |
|---|---|
| C$_1$–C$_3$, C5 | 2.2 |
| C4 | 5.4 |
| 2,2-DMC4 | 37.7 |
| 2,3-DMC$_4$ + 2-MC5 | 31.8 |
| 3-MC5 | 10.0 |
| n-C6 | 11.4 |
| CyC$_6$ + MCP | 1.5 |
| Total | 100.0 |

| Conversions | Percent | Rate (hr−1) |
|---|---|---|
| Decalin → i-C$_4$ + i-C6 | 53.8 | 0.15 |
| n-C$_6$ → i-C6 | 87.3 | 0.40 |

EXAMPLE 3

Reaction of Cyclohexane in n-Hexane at 50° C. with the TaF₅—HF Catalyst in the Presence of Naphthalene.

| Feed | ml | g | moles | moles % |
|---|---|---|---|---|
| n-C6 | 208.9 | 137.9 | 1.60 | 78.43 |
| CyC6 | 43.2 | 33.7 | 0.40 | 19.61 |
|  | — | 5.20 | 0.04 | 1.96 |
| Catalyst | | | | |
| TaF5 | 5.9 | 27.6 | 0.10 | |
| HF | 36 | 36.0 | 1.75 | |
| H2 | | 1.8 | 0.9 | |
| 5% Pt/C | — | ~0.5 | 1.28×10−4 | |

Reactions Conditions

| Temperature | 50° C. |
|---|---|
| Time | 5 hr. |
| Moles of Reactants / Moles of Catalyst | 16 |

The results indicate the following distribution of products and conversions:

| Product Distribution | Area % |
|---|---|
| C₁-C₅ (less C₄) | 1.54 |
| i-C₄ + n-C4 | 1.69 |
| 2,2-DMC4 | 40.80 |
| 2,3-DMC₄ + 2-MC5 | 33.31 |
| 3-MC5 | 11.55 |
| n-C6 | 6.54 |
| MCP + CyC6 | 4.53 |
| Total | 99.96 |

| Conversion | Percent |
|---|---|
| n-C₆ → i-C6 | 91.7 |
| CyC₆ → i-C6 | 76.9 |
|  → i-C₄ + i-C₆ | 86.2 |

EXAMPLE 4

REACTION OF POLYPROPYLENE IN FREON 113 at 50° C. WITH THE HF—TaF₅ CATALYST

| REACTOR: | 300 cm³ Autoclave Engineers Autoclave |
|---|---|
| REACTANT: | Polypropylene, 5.0 g - Average Molecular Weight 200,000 20 mesh, melt index 5 |
| SOLVENT: | Freon 113, 100 cm3 |
| CATALYST: | TaF₅ (27.6 g., 0.10 mole) HF (31.0 g., 1.55 mole) 5% Pt on C (0.5 g) |
| CONDITIONS: | T, ° C  50 |
| | $P_{H_2\ initial}$ psi  500  ($P_{H_2\ final}$ = 250 psi) |
| | Stirring, rpm  600 |
| | Time, min  45 |

| PRODUCT DISTRIBUTION | AREA % |
|---|---|
| propane | 7.32 |
| isobutane | 56.65 |
| normal-butane | 2.28 |
| isopentane | 24.13 |
| normal-pentane | 3.57 |
| 2,3-dimethylbutane + 2-methylpentane | 6.86 |
| 3,-methylpentane | 1.55 |
| normal-hexane | 0.64 |

84% conversion of polypropylene in 45 minutes

EXAMPLE 5

REACTION OF POLYETHYLENE IN FREON 113 at 50° C WITH HF—TaF₅ CATALYST

| REACTOR: | 300 cm³ Autoclave Engineers Autoclave |
|---|---|
| REACTANT: | Polyethylene, 5.0 g - Average Molecular Weight 800,000 20 mesh, melt index 0.3 |
| SOLVENT: | Freon 113, 100 cm3 |
| CATALYST: | TaF₅ (27.6 g., 0.10 mole) HF (41.0 g., 2.05 mole) 5% Pt on C (0.5g) |
| CONDITIONS: | T, ° C  50 |
| | $P_{H_2\ initial}$ psi  500  ($P_{H_2\ final}$ = 200 psi) |
| | Stirring, rpm  600 |
| | Time, min.  22 |

REACTION OF POLYETHYLENE IN FREON 113 at 50° C WITH HF—TaF₅ CATALYST

| PRODUCT DISTRIBUTION | AREA % |
|---|---|
| propane | 7.30 |
| isobutane | 52.09 |
| normal-butane | 1.15 |
| isopentane | 25.47 |
| normal-pentane | 3.61 |
| 2,3-dimethylbutane + 2-methylpentane | 7.71 |
| 3-methylpentane | 1.78 |
| normal-hexane | 0.89 |

72% Conversion of polyethylene in 22 minutes.

EXAMPLE 6

HYDROCRACKING 400°-700° F. b.p. FEED WITH HF/TaF₅

34.5 g of a 400°-700° F. b.p. hydrockate (82 ppm sulfur, b 17.5 ppm nitrogen, b 45% paraffins and naphthenes, 55% aromatics), 46.5 g. (2.34 mole) hydrogen fluoride and 55.2 g. (0.200 mole) tantalum pentafluroide were added to a 300 cc Hasteloy-C autoclave. The autoclave was pressured to 500 psig with hydrogen and heated to 80° C. at which the total pressure was maintained at 700-900 psig using hydrogen. As the reaction proceeded the autoclave was cooled periodically to vent any hydrocarbon gases that were formed. At these times fresh feed was also added. Hydrocracking of the feed was monitored by measuring the hydrogen consumption. While good conversion was observed for the first batch of feed very little was observed for the second and none for the third. The temperature was increased from 80°-140° C., to little avail, during the reaction in order to increase the reaction rate. After 51 hours the hydrocarbon layer was separated from the acid layer. The remaining acid layer was treated with ice. The oil which separated from the resultant two phase solution was combined with the other hydrocarbon products to yield 78.5 g. of oil.

| Reaction Time (hrs.) | Temperature Range (° C.) | Feed Added (g.) | Hydrogen Consumption millimoles/hr. |
|---|---|---|---|
| 0 | — | 34.5 | — |
| 6 | 80 | 34.5 | 22 |
| 27 | 70-100 | — | 2.9 |
| 46.5 | 120 | 34.5 | 4.7 |
| 51 | 140 | — | 0 |

This experiment demonstrates that the acid HF/TaF₅ exhibits good hydrocracking activity for the first batch of feed, but is rapidly deactivated, by succeeding batches. Evidence of this is obtained from hydrogen consumption column which indicates that the reaction ceased after the second recycle.

EXAMPLE 7

HYDROCRACKING 400°-700° F. b.p. FEED WITH HF/TaF₅--Pt/C

In a 300 cc Hasteloy-C autoclave was placed 1.83 g. of 5% Pt/C, 34.5 g of the 400°-700° F. b.p. hyrockate 46.9 g (2.34 moles) hydrogen fluoride, and 55.2 g (0.200 mole) tantalum fluoride. The mixture was pressured up with hydrogen and heated to 80° C. A similar reaction procedure was followed as in the earlist experiment. The hydrogen pressure was maintained between 300-1000 psig throughout the reaction. The reaction product was worked up to yield 300.2 g of oil. See analysis below:

| °F. | wt. % feed boiling in range | wt. % 300.2 g of product boiling in range |
|---|---|---|
| <0 | — | — |
| <0 | — | 0.7 |
| 0–400 | 7.0 | 41.1 |
| 400–700 | 93.0 | 58.3 |
| 700 | | |

| Reaction Time, Hrs. | Temperature Range, °C. | Feed Added, g | Hydrocarbon Samples, g | Hydrogen Consumption millimoles/hour |
|---|---|---|---|---|
| 0 | — | 34.5 | — | — |
| 5 | 80–90 | 34.5 | — | 38 |
| 23 | 80–90 | 34.5 | — | 23 |
| 26 | 100 | 34.5 | 55.4 | 50 |
| 30 | 100 | 34.5 | 28.0 | 49 |
| 47 | 80 | 34.5 | 31.8 | 11 |
| 50 | 110 | 34.5 | 35.2 | 63 |
| 53 | 110 | 34.5 | 33.8 | 66 |
| 55 | 120 | 34.5 | — | 95 |
| 71 | 80 | — | 70.1 | 21 |

This experiment demonstrates that adding Pt/C to the HF/TaF$_5$ hydrocracking catayst increases the acid's activity by a factor of 1.7 and its life indefinitely. The increase in catalyst activity is determined by dividing the hydrogen consumption in the first hour in this experiment by the hydrogen consumption in the first hour in Example 6. Evidence for catalyst life is the continued hydrogen consumption after eight recycles. In Example 6 hydrogen consumption stopped after 2 recycles.

What is claimed is:

1. A hydrocracking process which comprises contacting a hydrocarbon feedstock which has an initial boiling point of at least about 215° C with hydrogen, under hydrocracking conditions, and with a substantially liquid phase acid catalyst comprised of:
   a. a metal fluoride wherein the metal is selected from the group consisting of tantalum, niobium, boron and mixtures thereof;
   b. an acid selected from the group consisting of hydrofluoric acid, C$_1$–C$_4$ trifluoroalkylsulfonic acid, fluorosulfonic acid and trifluoroacetic acid; and
   c. a supported Group VIII noble metal hydrogenation component; the acid being present in at least an equimolar ratio relative to the metal fluoride and at least a portion of the metal fluoride is dissolved in the acid, the hydrogenation component being dispersed in the liquid acid phase and recovering a hydrocarbon product having an average molecular weight lower than the molecular weight of the feedstock.

2. The process of claim 1, wherein the hydrocracking process is carried out at temperatures ranging from about 20°–300° C.

3. The process of claim 2 wherein the metal of the metal fluoride is selected from the group consisting of tantalum, niobium and mixtures thereof. The acid is hydrofluoric acid and the noble metal is platinum.

4. The process of claim 3 wherein the mole ratio of acid to metal fluoride is at least 2:1.

5. The process of claim 1 wherein the moles of hydrogen per mole of hydrocarbon feedstock ranges from 0.01 to 5.0.

6. The process of claim 2 wherein the hydrogen partial pressure ranges from about 25 to 3000 psig.

7. The process of claim 2 wherein at least 0.0001 wt. %, based on acid, of the metal hydrogenation component is present on the support.

8. A hydrocracking process which comprises contacting a hydrocarbon feedstock having an initial boiling point of at least about 215° C. with hydrogen, at temperatures ranging from about 20°–300° C., and with a substantially liquid phase acid catalyst comprised of:
   a. a metal fluoride selected from the group consisting of tantalum pentafluoride, niobium pentafluoride and mixtures thereof;
   b. hydrofluoric acid; and
   c. a supported platinum metal hydrogenation component; the acid being present in a molar ratio of at least 2:1 based on metal fluoride and at least a portion of the metal fluoride is dissolved in the acid, the hydrogenation component being dispersed in the liquid acid phase and recovering a hydrocarbon product having an average molecular weight lower than the average molecular weight of the feedstock.

9. The process of claim 8 wherein the feedstock is selected from the group consisting of cycle stocks, residua and mixtures thereof.

10. The process of claim 8 wherein the hydrocracking process is carried out at temperatures ranging from about 50°–160° C. and hydrogen partial pressures ranging from about 25–3000 psig.

11. The process of claim 8 wherein the hydrogenation component is platinum on carbon.

12. The process of claim 8 wherein the moles of hydrogen per mole of hydrocarbon feedstock ranges from 0.01 to 5.0.

13. The process of claim 8 wherein at least 0.0001 wt. %, based on acid, of the hydrogenation component is present on the support.

* * * * *